US006498674B1

(12) United States Patent
Sheridon

(10) Patent No.: US 6,498,674 B1
(45) Date of Patent: Dec. 24, 2002

(54) ROTATING ELEMENT SHEET MATERIAL WITH GENERALIZED CONTAINMENT STRUCTURE

(75) Inventor: Nicholas K. Sheridon, Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/549,518

(22) Filed: Apr. 14, 2000

(51) Int. Cl.[7] .......................... G02B 26/00; G09G 3/34; B29D 11/00; B29B 9/00

(52) U.S. Cl. ......................... 359/296; 345/84; 345/107; 264/1.36; 264/4.1; 264/8; 264/429

(58) Field of Search ............................ 359/296; 345/85, 345/105, 107, 108, 111; 264/1.36, 4.1, 8, 15, 24, 429, 437

(56) References Cited

U.S. PATENT DOCUMENTS

| | | | |
|---|---|---|---|
| 2,326,634 A | 8/1943 | Gebhard et al. | 88/82 |
| 2,354,018 A | 7/1944 | Heltzer et al. | 88/82 |
| 2,354,048 A | 7/1944 | Palmquist | 40/135 |
| 2,354,049 A | 7/1944 | Palmquist | 40/135 |
| 2,407,680 A | 9/1946 | Palmquist et al. | 88/82 |
| 2,600,963 A | 6/1952 | Bland | 49/58 |
| 2,684,788 A | 7/1954 | Bland | 222/177 |
| 2,794,301 A | 6/1957 | Law et al. | 49/84 |
| 2,950,985 A | 8/1960 | d'Adrian | 117/33 |
| 2,965,921 A | 12/1960 | Bland | 18/2.5 |
| 2,980,547 A | 4/1961 | d'Adrian | 106/47 |
| 3,036,388 A | 5/1962 | Tate | 35/66 |

(List continued on next page.)

FOREIGN PATENT DOCUMENTS

| | | |
|---|---|---|
| WO | WO 98/03896 | 1/1998 |
| WO | WO 98/41899 | 9/1998 |
| WO | WO 99/10767 | 3/1999 |

OTHER PUBLICATIONS

L.L. Lee, "A Magnetic–Particles Display," IEEE Transactions on Electron Devices, vol. ED–22, No. 9, Sep. 1975, pp. 758–765.

L.L. Lee, "Fabrication of Magnetic Particles Displays," Proceeding of the S.I.D., vol. 18/3 & 4 1977, pp. 283–288.

"Xerox PARC and 3M to collaborate on electronic paper," Information Today, vol. 16, No. 8, Sep. 1999.

Gibbs, "The Reinvention of Paper," Scientific American: Technology and Business, Sep. 1998.

Mann, "Who will own your next good idea?" The Atlantic Monthly, Sep. 1998, vol. 282, pp. 57–82.

Comiskey et al., "An electrophoretic ink for all–printed reflective electronic displays," Nature, Jul. 16, 1998, vol. 394, pp. 253–255.

Klein, "Will the future be written in E–ink?" The Wall Street Journal, Jan. 4, 2000.

Wisnieff, "Printing Screens," Nature, Jul. 16, 1998, vol. 394, Issue No. 6690, pp. 225 and 227.

Mattis, "Screen Saviors," Business 2.0, Jul. 1999.

*Primary Examiner*—Loha Ben

(74) *Attorney, Agent, or Firm*—Finnegan, Henderson, Farabow, Garrett & Dunner, L.L.P.

(57) ABSTRACT

The present invention relates to rotating element sheet material with a generalized containment structure and methods of fabricating such rotating element sheet material, where the rotating element sheet material comprises a fibrous matrix, a plurality of rotatable elements, and an enabling fluid, and where the plurality of rotatable elements are disposed within the fibrous matrix and are in contact with the enabling fluid. In addition, rotating element sheet material with a generalized containment structure, and methods of fabricating such rotating element sheet material, includes rotating element sheet material which comprises a fibrous matrix and a plurality of micro-capsules, and where the micro-capsules define a hollow space therein, and the hollow space contains a subset of a plurality of rotatable elements and an enabling fluid, and where the plurality of micro-cavities are disposed within the fibrous matrix.

39 Claims, 8 Drawing Sheets

U.S. PATENT DOCUMENTS 3,063,388 A 11/1962 Magarian et al. ........... 105/376
3,150,947 A 9/1964 Bland ............................ 65/21
3,222,204 A 12/1965 Weber et al. ................. 117/27
3,243,273 A 3/1966 Bland ............................ 65/21
3,310,391 A 3/1967 Law .............................. 65/21
3,406,363 A 10/1968 Tate ........................... 335/302
3,594,065 A 7/1971 Marks ........................ 350/160
3,615,993 A 10/1971 French ....................... 156/155
3,617,333 A 11/1971 Brown ........................ 117/35
3,648,281 A 3/1972 Dahms et al. ............. 340/373
3,795,435 A 3/1974 Schwab ...................... 350/105
3,915,771 A 10/1975 Gatzke et al. ................ 156/71
3,982,334 A 9/1976 Tate .............................. 35/66
4,001,140 A 1/1977 Foris et al. ................. 252/316
4,002,022 A 1/1977 Lopez ......................... 58/126
4,082,426 A 4/1978 Brown ....................... 350/105
RE29,742 E 8/1978 Tung ............................ 2/412
4,117,192 A 9/1978 Jorgensen ................... 428/337
4,117,194 A 9/1978 Barbe et al. ................ 428/374
4,126,854 A 11/1978 Sheridon .................... 340/373
4,143,103 A 3/1979 Sheridon ....................... 264/4
4,143,472 A 3/1979 Murata et al. ................. 35/66
4,229,732 A 10/1980 Hartstein et al. ........ 340/378.2
4,232,084 A 11/1980 Tate ........................... 428/309
4,253,909 A 3/1981 Lee ........................... 156/654
4,256,677 A 3/1981 Lee ............................... 264/8
4,261,653 A 4/1981 Goodrich .................... 350/362
4,267,946 A 5/1981 Thatcher ..................... 222/345
4,268,413 A 5/1981 Dabisch ...................... 252/408
4,273,672 A 6/1981 Vassiliades ................. 252/316
4,283,438 A 8/1981 Lee ............................. 427/47
4,288,788 A 9/1981 Rogers et al. ........... 340/378.2
4,299,880 A 11/1981 Arens ......................... 428/304
4,367,920 A 1/1983 Tung et al. ................. 350/105
4,368,952 A 1/1983 Murata et al. .............. 350/362
4,374,889 A 2/1983 Arens ......................... 428/207
4,381,616 A 5/1983 Saxer .......................... 40/502
4,402,062 A 8/1983 Batchelder .................. 365/153
4,411,973 A 10/1983 Gilmour et al. ............... 430/7
4,417,543 A 11/1983 Lee ........................... 118/620
4,418,098 A 11/1983 Maistrovich ................ 427/161
4,418,346 A 11/1983 Batchelder .................. 340/787
4,419,383 A 12/1983 Lee ............................. 427/47
4,438,160 A 3/1984 Ishikawa et al. ............ 427/214
4,441,791 A 4/1984 Hornbeck ................... 350/360
4,457,723 A 7/1984 Tate ........................... 434/409
4,492,435 A 1/1985 Banton et al. .............. 350/360
4,500,172 A 2/1985 Gagnon et al. ......... 350/331 R
4,511,210 A 4/1985 Tung et al. ................. 350/105
4,532,608 A 7/1985 Wu ........................... 365/127
4,569,857 A 2/1986 Tung et al. ................. 427/163
4,592,628 A 6/1986 Altman et al. .............. 350/486
4,627,689 A 12/1986 Asher ........................ 350/362
4,632,517 A 12/1986 Asher ........................ 350/362
4,675,476 A 6/1987 Kobayashi ................... 178/18
4,678,695 A 7/1987 Tung et al. ................. 428/120
4,688,900 A 8/1987 Doane et al. ............... 350/347
4,695,528 A 9/1987 Dabisch et al. ............. 430/290
4,710,732 A 12/1987 Hornbeck .................. 332/7.51
4,713,295 A 12/1987 Laroche ...................... 428/406
4,721,649 A 1/1988 Belisle et al. ............... 428/325
4,725,494 A 2/1988 Belisle et al. ............... 428/325
4,729,687 A 3/1988 Arens ......................... 401/198
4,740,266 A 4/1988 Wu ........................... 156/633
4,781,789 A 11/1988 Wu ........................... 156/633
4,781,790 A 11/1988 Wu ........................... 156/633
4,783,236 A 11/1988 Wu ........................... 156/633
4,795,243 A 1/1989 Suzuki ....................... 350/362
4,795,528 A 1/1989 Wu ........................... 156/633
4,810,431 A 3/1989 Leidner ....................... 264/15
4,837,071 A 6/1989 Tagoku et al. .............. 428/195
4,877,253 A 10/1989 Arens ......................... 372/240
4,890,902 A 1/1990 Doane et al. ............... 350/347
4,919,521 A 4/1990 Tada et al. .................. 350/362
4,931,019 A 6/1990 Park ........................... 434/409
4,948,232 A 8/1990 Lange ........................ 350/334
4,956,619 A 9/1990 Hornbeck ................... 330/4.3
4,991,941 A 2/1991 Kalmanash ................. 350/347
4,994,204 A 2/1991 Doane et al. .......... 252/299.01
5,039,557 A 8/1991 White ........................ 427/137
5,066,559 A 11/1991 Elmasry et al. ............. 430/111
5,075,186 A 12/1991 Sheridon ...................... 430/47
5,128,203 A 7/1992 LaRoche .................... 428/325
5,131,736 A 7/1992 Alvarez ...................... 359/886
5,151,032 A 9/1992 Igawa ........................ 434/409
5,155,607 A 10/1992 Inoue et al. .................. 359/51
5,157,011 A 10/1992 Okabe et al. ............... 503/201
5,189,658 A 2/1993 Moses ........................ 369/100
5,219,820 A 6/1993 Morohoshi et al. ......... 503/204
5,223,473 A 6/1993 Oliver et al. ............... 503/226
5,226,099 A 7/1993 Mignardi et al. ............. 385/19
5,233,459 A 8/1993 Bozler et al. ............... 359/230
5,249,000 A 9/1993 Okabe et al. ............... 346/151
5,251,048 A 10/1993 Doane et al. ................. 359/51
5,262,098 A 11/1993 Crowley et al. ............... 264/8
5,262,374 A 11/1993 Okabe et al. ............... 503/201
5,270,872 A 12/1993 Spry .......................... 359/885
5,274,460 A 12/1993 Yamada et al. ............. 358/296
5,290,066 A 3/1994 Mody ........................ 281/15.1
5,315,418 A 5/1994 Sprague et al. ............... 359/41
5,315,776 A 5/1994 Strawbridge et al. ......... 40/505
5,331,454 A 7/1994 Hornbeck ................... 359/224
5,344,594 A 9/1994 Sheridon .................... 264/4.1
5,351,995 A 10/1994 Booker ....................... 283/117
5,354,598 A 10/1994 Arens ......................... 428/195
5,363,222 A 11/1994 Ledebuhr ..................... 359/40
5,383,008 A 1/1995 Sheridon .................... 355/256
5,384,067 A 1/1995 Doane et al. .......... 252/299.01
5,389,426 A 2/1995 Arens et al. ................ 428/195
5,389,945 A 2/1995 Sheridon ...................... 345/85
5,397,503 A 3/1995 Yuasa et al. ........... 252/299.01
5,411,398 A 5/1995 Nakanishi et al. .......... 434/409
5,416,996 A 5/1995 Clemens et al. .............. 40/502
5,432,526 A 7/1995 Hyatt .......................... 345/87
5,432,534 A 7/1995 Maruyama et al. ......... 347/172
5,459,602 A 10/1995 Sampsell .................... 359/234
5,469,020 A 11/1995 Herrick ...................... 313/511
5,515,075 A 5/1996 Nakagiri et al. ............ 345/111
5,526,016 A 6/1996 Nakagiri et al. ............ 345/111
5,535,047 A 7/1996 Hornbeck ................... 359/295
5,582,700 A 12/1996 Bryning et al. ............. 204/450
5,604,027 A 2/1997 Sheridon .................... 428/323
5,627,562 A 5/1997 Skodlar ...................... 345/111
5,659,330 A 8/1997 Sheridon ...................... 345/84
5,667,924 A 9/1997 Ziolo ........................... 430/39
5,703,671 A 12/1997 Narita et al. .................. 355/32
5,708,525 A 1/1998 Sheridon .................... 359/296
5,717,283 A 2/1998 Biegelsen et al. .......... 313/483
5,717,514 A 2/1998 Sheridon .................... 359/296
5,717,515 A 2/1998 Sheridon .................... 359/296
5,723,204 A 3/1998 Stefik ......................... 428/206
5,724,064 A 3/1998 Stefik et al. ................ 345/105
5,731,792 A 3/1998 Sheridon ...................... 345/84
5,737,115 A 4/1998 Mackinlay et al. ......... 359/296
5,739,801 A 4/1998 Sheridon ...................... 345/84
5,739,946 A 4/1998 Iwanaga et al. ............ 359/296
5,751,268 A 5/1998 Sheridon .................... 345/107
5,754,332 A 5/1998 Crowley ..................... 359/296
5,757,345 A 5/1998 Sheridon ...................... 345/84
5,760,761 A 6/1998 Sheridon .................... 345/107
5,767,826 A 6/1998 Sherdon et al. ............... 345/84

| | | | | |
|---|---|---|---|---|
| 5,777,782 | A | 7/1998 | Sheridon | 359/296 |
| 5,784,189 | A | 7/1998 | Bozler et al. | 359/254 |
| 5,808,593 | A | 9/1998 | Sheridon | 345/84 |
| 5,808,783 | A | 9/1998 | Crowley | 359/296 |
| 5,815,306 | A | 9/1998 | Sheridon et al. | 359/296 |
| 5,821,624 | A | 10/1998 | Pasch | 257/776 |
| 5,825,529 | A | 10/1998 | Crowley | 359/296 |
| 5,828,441 | A | 10/1998 | Narita et al. | 355/32 |
| 5,866,284 | A | 2/1999 | Vincent | 430/37 |
| 5,869,929 | A | 2/1999 | Eida et al. | 313/501 |
| 5,877,844 | A | 3/1999 | Matsumoto | 355/35 |
| 5,891,479 | A | 4/1999 | Sheridon | 425/8 |
| 5,892,497 | A | 4/1999 | Robertson | 345/107 |
| 5,893,206 | A | 4/1999 | Furlani et al. | 29/608 |
| 5,894,367 | A | 4/1999 | Sheridon | 359/623 |
| 5,900,192 | A | 5/1999 | Richley | 264/8 |
| 5,900,858 | A | 5/1999 | Richley | 345/107 |
| 5,904,790 | A | 5/1999 | Sheridon | 156/83 |
| 5,906,743 | A | 5/1999 | Cohen et al. | 210/502.1 |
| 5,914,805 | A | 6/1999 | Crowley | 359/296 |
| 5,917,646 | A | 6/1999 | Sheridon | 359/296 |
| 5,919,409 | A | 7/1999 | Sheridon | 264/8 |
| 5,922,268 | A | 7/1999 | Sheridon | 264/437 |
| 5,930,026 | A | 7/1999 | Jacobson et al. | 359/296 |
| 5,940,054 | A | 8/1999 | Harris | 345/85 |
| 5,956,005 | A | 9/1999 | Sheridon | 345/84 |
| 5,961,804 | A | 10/1999 | Jacobson et al. | 204/606 |
| 5,969,472 | A | 10/1999 | Kisner | 313/484 |
| 5,974,901 | A | 11/1999 | Zborowski et al. | 73/865.5 |
| 5,975,680 | A | 11/1999 | Wen et al. | 347/43 |
| 5,976,428 | A | 11/1999 | Richley | 264/10 |
| 5,982,346 | A | 11/1999 | Sheridon et al. | 345/85 |
| 5,986,629 | A | 11/1999 | Smith et al. | 345/84 |
| 5,989,629 | A | 11/1999 | Sacripante et al. | 427/180 |
| 6,014,116 | A | 1/2000 | Haynes et al. | 345/1 |
| 6,014,247 | A | 1/2000 | Winter et al. | 359/296 |
| 6,017,584 | A | 1/2000 | Albert et al. | 427/213.3 |
| 6,034,807 | A | 3/2000 | Little et al. | 359/227 |
| 6,038,059 | A | 3/2000 | Silverman | 359/296 |
| 6,054,071 | A | 4/2000 | Mikkelsen, Jr. | 264/1.36 |
| 6,054,809 | A | 4/2000 | Haynes et al. | 313/505 |
| 6,055,091 | A | 4/2000 | Sheridon et al. | 359/296 |
| 6,067,185 | A | 5/2000 | Albert et al. | 359/296 |
| 6,072,621 | A | 6/2000 | Kishi et al. | 359/296 |
| 6,097,531 | A | 8/2000 | Sheridon | 359/296 |
| 6,110,538 | A | 8/2000 | Sheridon | 427/457 |
| 6,118,419 | A | 9/2000 | Smith et al. | 345/84 |
| 6,120,588 | A | 9/2000 | Jacobson | 106/31.16 |
| 6,120,839 | A | 9/2000 | Comiskey et al. | 427/213.3 |
| 6,122,094 | A | 9/2000 | Silverman | 359/296 |
| 6,128,124 | A | 10/2000 | Silverman | 359/296 |
| 6,130,773 | A | 10/2000 | Jacobson et al. | 359/296 |
| 6,137,467 | A | 10/2000 | Sheridon et al. | 345/107 |
| 6,147,791 | A | 11/2000 | Sheridon | 359/296 |
| 6,162,321 | A | 12/2000 | Silverman | 156/276 |
| 6,174,153 | B1 | 1/2001 | Sheridon | 425/3 |
| RE37,085 | E | 3/2001 | Sheridon | 428/323 |
| 6,197,228 | B1 | 3/2001 | Sheridon | 264/1.36 |
| 6,211,998 | B1 | 4/2001 | Sheridon | 359/296 |

ROTATING ELEMENT SHEET MATERIAL WITH GENERALIZED CONTAINMENT STRUCTURE

I. FIELD OF INVENTION

The present invention relates to the preparation and use of rotating element sheet material with a generalized containment structure. Specifically, the present invention relates to the preparation and use of rotating element sheet material with a matrix substrate, or a substrate derived from a matrix structure.

II. BACKGROUND OF THE INVENTION

Rotating element sheet material has been disclosed in U.S. Pat. Nos. 4,126,854 and 4,143,103, both herein incorporated by reference, and generally comprises a substrate, an enabling fluid, and a class of rotatable elements. As discussed more below, rotating element sheet material has found a use as "reusable electric paper." FIG. 1 depicts an enlarged section of rotating element sheet material 18, including rotatable element 10, enabling fluid 12, cavity 14, and substrate 16. Observer 28 is also shown. Although FIG. 1 depicts a spherically shaped rotatable element and cavity, many other shapes will work and are consistent with the present invention. As disclosed in U.S. Pat. No. 5,389,945, herein incorporated by reference, the thickness of substrate 16 may be of the order of hundreds of microns, and the dimensions of rotatable element 10 and cavity 14 may be of the order of 10 to 100 microns.

In FIG. 1, substrate 16 is an elastomer material, such as silicone rubber, that accommodates both enabling fluid 12 and the class of rotatable elements within a cavity or cavities disposed throughout substrate 16. The cavity or cavities contain both enabling fluid 12 and the class of rotatable elements such that rotatable element 10 is in contact with enabling fluid 12 and at least one translational degree of freedom of rotatable element 10 is restricted. The contact between enabling fluid 12 and rotatable element 10 breaks a symmetry of rotatable element 10 and allows rotatable element 10 to be addressed. The state of broken symmetry of rotatable element 10, or addressing polarity, can be the establishment of an electric dipole about an axis of rotation. For example, it is well known that small particles in a dielectric liquid acquire an electrical charge that is related to the Zeta potential of the surface coating. Thus, an electric dipole can be established on a rotatable element in a dielectric liquid by the suitable choice of coatings applied to opposing surfaces of the rotatable element.

The use of rotating element sheet material as "reusable electric paper" is due to that fact that the rotatable elements are typically given a second broken symmetry, a multivalued aspect, correlated with the addressing polarity discussed above. That is, the above mentioned coatings may be chosen so as to respond to incident electromagnetic energy in distinguishable ways. Thus, the aspect of rotatable element 10 to observer 28 favorably situated can be controlled by an applied vector field.

For example, as disclosed in U.S. Pat. No. 4,126,854, hereinabove incorporated by reference, rotatable element 10 may comprise a black polyethylene generally spherical body with titanium oxide sputtered on one hemisphere, where the titanium oxide provides a light-colored aspect in one orientation. Such a rotatable element in a transparent dielectric liquid will exhibit the desired addressing polarity as well as the desired aspect.

II.A. Rotatable elements with two-valued aspects

A multivalued aspect in its simplest form is a two-valued aspect. When the aspect is the chromatic response to visible light, a rotatable element with a two-valued aspect can be referred to as a bichromal rotatable element. Such a rotatable element is generally fabricated by the union of two layers of material as described in U.S. Pat. No. 5,262,098, herein incorporated by reference.

FIGS. 2–5 depict rotatable element 10 with a two-valued aspect and an exemplary system that use such rotatable elements from the prior art. In FIG. 2, rotatable element 10 is composed of first layer 20 and second layer 22 and is, by way of example again, a generally spherical body. The surface of first layer 20 has first coating 91 at a first Zeta potential, and the surface of second layer 22 has second coating 93 at a second Zeta potential. First coating 91 and second coating 93 are chosen such that, when in contact with a dielectric fluid (not shown), first coating 91 has a net positive electric charge with respect to second coating 93. This is depicted in FIG. 2 by the "+" and "−" symbols respectively. Furthermore, the combination of first coating 91 and the surface of first layer 20 is non-white-colored, indicated in FIG. 2 by hatching, and the combination of second coating 93 and the surface of second layer 22 is white-colored. One skilled in the art will appreciate that the material associated with first layer 20 and first coating 91 may be the same. Likewise, the material associated with second layer 22 and second coating 93 may be the same.

FIG. 3 depicts no-field set 30. No-field set 30 is a subset of randomly oriented rotatable elements in the vicinity of vector field 24 when vector field 24 has zero magnitude. Vector field 24 is an electric field. No-field set 30, thus, contains rotatable elements with arbitrary orientations with respect to each other. Therefore, observer 28 in the case of no-field set 30 registers views of the combination of second coating 93 and the surface of second layer 22, and first coating 91 and the surface of first layer 20 (as depicted in FIG. 2) in an unordered sequence. Infralayer 26 forms the backdrop of aspect 34. Infralayer 26 can consist of any type of material, including but not limited to other rotatable elements, or some material that presents a given aspect to observer 28.

FIGS. 4 and 5 depict first aspect set 32. First aspect set 32 is a subset of rotatable elements in the vicinity of vector field 24 when the magnitude of vector field 24 is nonzero and has the orientation indicated by arrow 25. In first aspect set 32, all of the rotatable elements orient themselves with respect to arrow 25 due to the electrostatic dipole present on each rotatable element 10. In contrast to no-field set 30, observer 28 in the case of first aspect set 32 registers a view of a set of rotatable elements ordered with the non-white-colored side up (the combination of first coating 91 and the surface of first layer 20 as depicted in FIG. 2). Again, infralayer 26 forms the backdrop of the aspect. In FIGS. 4 and 5, rotatable element 10, under the influence of applied vector field 24, orients itself with respect to vector field 24 due to the electric charges present as a result of first coating 91 and second coating 93. FIG. 4 is a side view indicating the relative positions of observer 28, first aspect set 32, and infralayer 26. FIG. 5 is an alternate view of first aspect set 32 from a top perspective. In FIG. 5, the symbol Θ indicates an arrow directed out of the plane of the figure.

One skilled in the art will appreciate that first aspect set 32 will maintain its aspect after applied vector field 24 is removed, in part due to the energy associated with the attraction between rotatable element 10 and the substrate structure, as, for example, cavity walls (not shown). This energy contributes, in part, to the switching characteristics and the memory capability of rotating element sheet material 18, as disclosed in U.S. Pat. No. 4,126,854, hereinabove incorporated by reference, and discussed in more detail below.

II.B. Rotatable elements with multivalued aspect

A rotatable element with multivalued aspect is generally fabricated as disclosed in U.S. Pat. No. 5,919,409, herein incorporated by reference. An exemplary rotatable element 10 with multivalued aspect of the prior art is depicted in FIG. 6. Rotatable element 10 in FIG. 6 is composed of first layer 36, second layer 37 and third layer 38. The surface of third layer 38 has third coating 95 at a first Zeta potential, and the surface of first layer 36 has first coating 94 at a second Zeta potential such that third coating 95 has a net positive charge, "+," with respect to first coating 94 when rotatable element 10 is in contact with a dielectric fluid (not shown). First layer 36, first coating 94, third layer 38, and third coating 95 may be chosen to be transparent to visible light and second layer 37 may be chosen to be opaque or transparent-colored to visible light, such that the rotatable element acts as a "light-valve," as disclosed, for example, in U.S. Pat. No. 5,767,826, herein incorporated by reference, and U.S. Pat. No. 5,737,115, herein incorporated by reference. As above, one skilled in the art will appreciate that the material associated with first layer 36 and first coating 94 may be the same. Likewise, the material associated with third layer 38 and third coating 95 may be the same.

Rotatable elements with multivalued aspect are generally utilized in rotating element sheet material that use canted vector fields for addressing. A canted vector field is a field whose orientation vector in the vicinity of a subset of rotatable elements can be set so as to point in any direction in three-dimensional space. U.S. Pat. No. 5,717,515, herein incorporated by reference, discloses the use of canted vector fields in order to address rotatable elements. The use of canted vector fields with rotating element sheet material allows complete freedom in addressing the orientation of a subset of rotatable elements, where the rotatable elements have the addressing polarity discussed above.

One skilled in the art will appreciate that no-field set and first aspect set discussed above in FIGS. 3–5 can form the elements of a pixel, where vector field 24 can be manipulated on a pixel by pixel basis using an addressing scheme as discussed, for example, in U.S. Pat. No. 5,717,515, hereinabove incorporated by reference.

II.C. Work function

As discussed above, a useful property of rotating element sheet material is the ability to maintain a given aspect after applied vector field 24 for addressing is removed. This ability contributes, in part, to the switching characteristics and the memory capability of rotating element sheet material 18, as disclosed in U.S. Pat. No. 4,126,854, hereinabove incorporated by reference. This will be referred to as aspect stability. The mechanism for aspect stability in the above embodiments is generally the energy associated with the attraction between the rotatable elements and the containment structure, or "work function." A host of factors influence the magnitude of the energy associated with the work function including, but not limited to: surface tension of enabling fluid in contact with rotatable elements; the relative specific gravity of the rotatable elements to the enabling fluid; magnitude of charge on rotatable elements in contact with containment structure; relative electronic permittivity of enabling fluid and containment structure; "stickiness" of containment structure; and other residual fields that may be present. The applied vector field for addressing must be strong enough to overcome the work function in order to cause an orientation change; furthermore, the work function must be strong enough to maintain this aspect in the absence of an applied vector field for addressing.

FIG. 7 depicts an exemplary diagram of number 54, N, of rotatable elements that change orientation as a function of applied vector field 24, V of the prior art. The work function 52, $V_w$, corresponds to the value of applied vector field 24 when the number 54 of rotatable elements that change orientation has reached the saturation level 56, $N_s$, corresponding to the orientation change of all rotatable elements 10.

II.D. Elastomer substrate

As mentioned above in connection with FIG. 1, the substrate of rotating element sheet material is generally an elastomer material such as silicone rubber. Because of the expense of silicone rubber, the substrate is currently the most expensive component of rotating element sheet material. Thus, in large-area-display applications of rotating element sheet material, the cost of the substrate is the primary impediment. Other qualities of rotating element sheet material, however, are ideally suited to large-area-display applications. Such qualities include: lack of sensitivity to uniform thickness, low power requirements, and a wide viewing angle.

One option that is available for large-area-display applications using rotating element sheet material without a silicone rubber substrate is based on the disclosure of U.S. Pat. No. 5,825,529, herein incorporated by reference (the '529 patent). The rotatable elements in the '529 patent are supported by neighboring rotatable elements in a packed relationship. However, because of the proximity of other rotatable elements with an addressing polarity, and the limited contact with a containment structure, the work function associated with an aspect of the rotating element sheet material disclosed in the '529 patent is less pronounced than in rotating element sheet material with a cavity-containing substrate. Thus, it remains desirable to fabricate rotating element sheet material with a generalized containment structure that exhibits a suitable work function.

III. SUMMARY OF THE INVENTION

Accordingly, in a first embodiment of the present invention, rotating element sheet material comprises a fibrous matrix and a plurality of rotatable elements, where the plurality of rotatable elements are disposed within the fibrous matrix and in contact with an enabling fluid.

In a second embodiment of the present invention, rotating element sheet material comprises a fibrous matrix, a plurality of micro-capsules, and a plurality of rotatable elements, where each of the plurality of micro-capsules contain a subset of the plurality of rotatable elements and an enabling fluid. Furthermore, an additional supporting material may be interstitially contained in the fibrous matrix.

In a first embodiment of a method for assembling rotating element sheet material, and the rotating element sheet material so produced, the method comprises dispersing a plurality of rotatable elements into pulp slurry, drying and pressing thin layers of the pulp slurry into a fibrous matrix where the plurality of rotatable elements are interstitially contained, and infusing the fibrous matrix with an enabling fluid.

In a second embodiment of a method for assembling rotating element sheet material, and the rotating element sheet material so produced, the method comprises encapsulating a plurality of rotatable elements and enabling fluid into a plurality of micro-capsules, dispersing the plurality of micro-capsules into pulp slurry, drying and pressing thin layers of the pulp slurry into a fibrous matrix where the plurality of micro-capsules are interstitially contained.

Furthermore, an additional supporting material may be introduced to the interstitial regions of the fibrous matrix.

In a third embodiment of a method for assembling rotating element sheet material, and the rotating element sheet material so produced, the method comprises pressing thin layers of pulp slurry into a fibrous matrix sheet, embossing cavities of size suitable to contain, preferably, single rotatable elements onto the surface of the fibrous matrix sheet using a mechanical embossing tool incorporating heat and pressure as needed, and subsequently drying the fibrous matrix sheet. Next, the rotatable elements are introduced to the embossed cavities by any conventional means known in the art, the fibrous matrix sheet is infused with enabling fluid, and the embossed cavities are sealed by laminating a second fibrous matrix sheet over the embossed fibrous matrix sheet. Alternatively, the embossed cavities are sealed by applying windowing material, such as glass or plastic sheets, to the embossed fibrous matrix sheet containing the rotatable elements in the embossed cavities. Also, and again alternatively, the embossed cavities can be introduced into dried fibrous matrix sheets using heat and pressure as required, and subsequently introducing the rotatable elements by any conventional means known in the art.

In a fourth embodiment of a method for assembling rotating element sheet material, and the rotating element sheet material so produced, the method comprises pressing thin layers of pulp slurry into a fibrous matrix sheet, embossing cavities of size suitable to contain, preferably, single micro-capsules containing one or more rotatable elements and enabling fluid, onto the surface of the fibrous matrix sheet using a mechanical embossing tool incorporating heat and pressure as needed, and subsequently drying the fibrous matrix sheet. Next, the micro-capsules are introduced to the embossed cavities by any conventional means known in the art, and the embossed cavities are sealed by laminating a second fibrous matrix sheet over the embossed fibrous matrix sheet. Alternatively, the embossed cavities are sealed by applying windowing material, such as glass or plastic sheets, to the embossed fibrous matrix sheet containing the micro-capsules in the embossed cavities. Also, and again alternatively, the embossed cavities can be introduced into dried fibrous matrix sheets using heat and pressure as required, and subsequently introducing the micro-capsules by any conventional means known in the art. Furthermore, an additional supporting material may be introduced to the interstitial regions of the fibrous matrix.

In a fifth embodiment of a method for assembling rotating element sheet material, and the rotating element sheet material so produced, the method comprises weaving a fibrous matrix sheet using a loom or other method of rapidly creating a fabric that enables placement of fibers in preferred patterns, where the preferred pattern in this embodiment defines preferred interstitial regions. Rotatable elements are subsequently introduced to the preferred interstitial regions of the fibrous matrix sheet by any conventional means known in the art, the fibrous matrix sheet is infused with enabling fluid, and further laminated by another sheet or windowing material, as previously described. Alternatively, the plurality of rotatable elements may be placed in a preferred spatial configuration with respect to one another and a plurality of fibers or fibrous material introduced, by electrostatic or other means, to randomly encapsulate the rotatable elements. The plurality of fibers or fibrous material thus arranged constitutes the desired fibrous matrix. The fibrous matrix is then infused with enabling fluid, and further laminated by another sheet or windowing material, as previously described.

Further still, in a sixth embodiment of a method for assembling rotating element sheet material, and the rotating element sheet material so produced, the method comprises weaving a fibrous matrix sheet using a loom or other method of rapidly creating a fabric that enables placement of fibers in preferred patterns, where the preferred pattern in this embodiment defines preferred interstitial regions. Micro-capsules containing one or more rotatable elements and enabling fluid, are subsequently introduced to the preferred interstitial regions of the fibrous matrix sheet by any conventional means known in the art and the fibrous matrix sheet is laminated by another sheet or windowing material, as previously described. Alternatively, the plurality of micro-capsules may be placed in a preferred spatial configuration with respect to one another and a plurality of fibers or fibrous material introduced, by electrostatic or other means, to randomly encapsulate the micro-capsules. The plurality of fibers or fibrous material thus arranged constitutes the desired fibrous matrix. The fibrous matrix is then laminated by another sheet or windowing material, as previously described. Furthermore, an additional supporting material may be introduced to the interstitial regions of the fibrous matrix.

IV. BRIEF DESCRIPTION OF DRAWINGS

The accompanying drawings, which are incorporated in and constitute a part of this specification, illustrate an implementation of the invention and, together with the description, serve to explain the advantages and principles of the invention.

V. DETAILED DESCRIPTION

Figure 1:
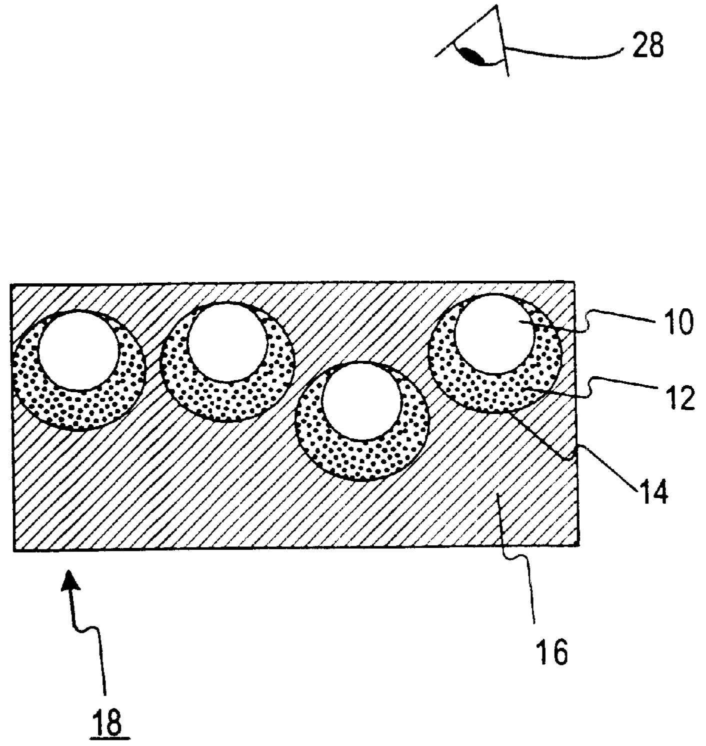
FIG. 1 (Prior Art)
FIG. 1 depicts an exemplary subsection of rotating element sheet material of the prior art.
Figure 2:
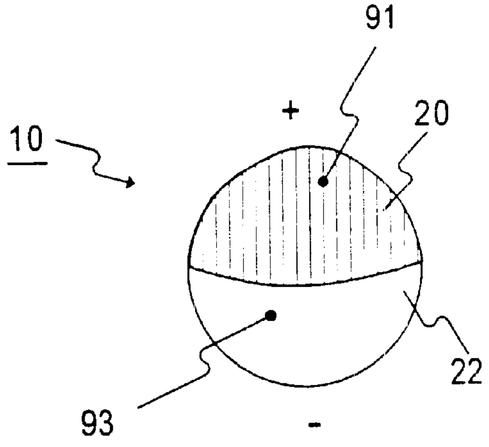
FIG. 2 (Prior Art)
FIG. 2 depicts an exemplary rotatable element of the prior art with a two-valued aspect.
Figure 3:
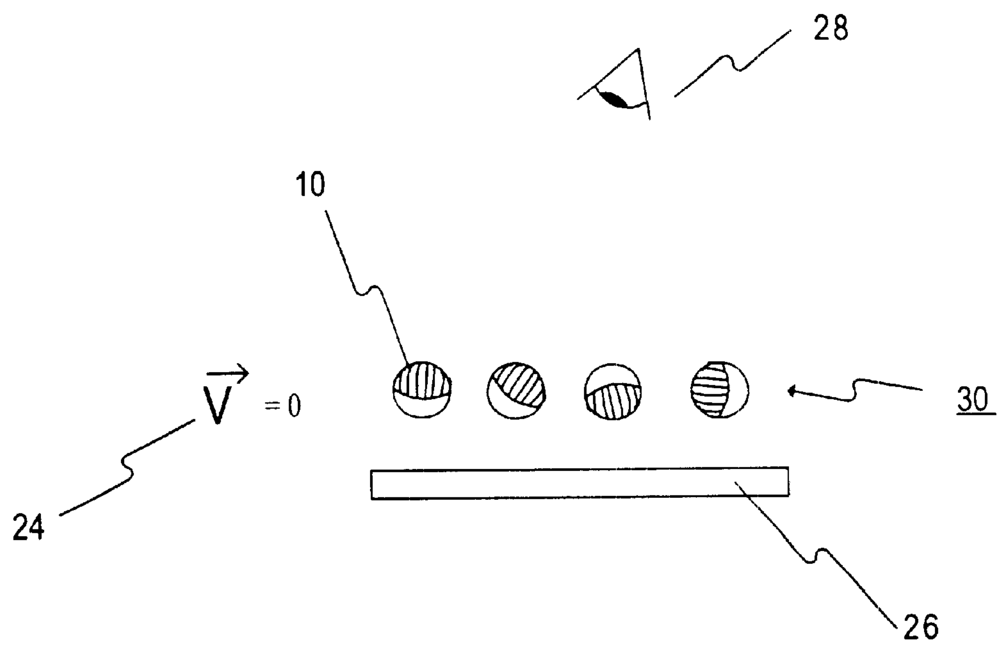
FIG. 3 (Prior Art)
FIG. 3 depicts an exemplary system of the prior art that uses rotatable elements with two-valued aspects of the prior art where the rotatable elements are randomly oriented in the presence of an addressing vector field with zero magnitude.
Figure 4:
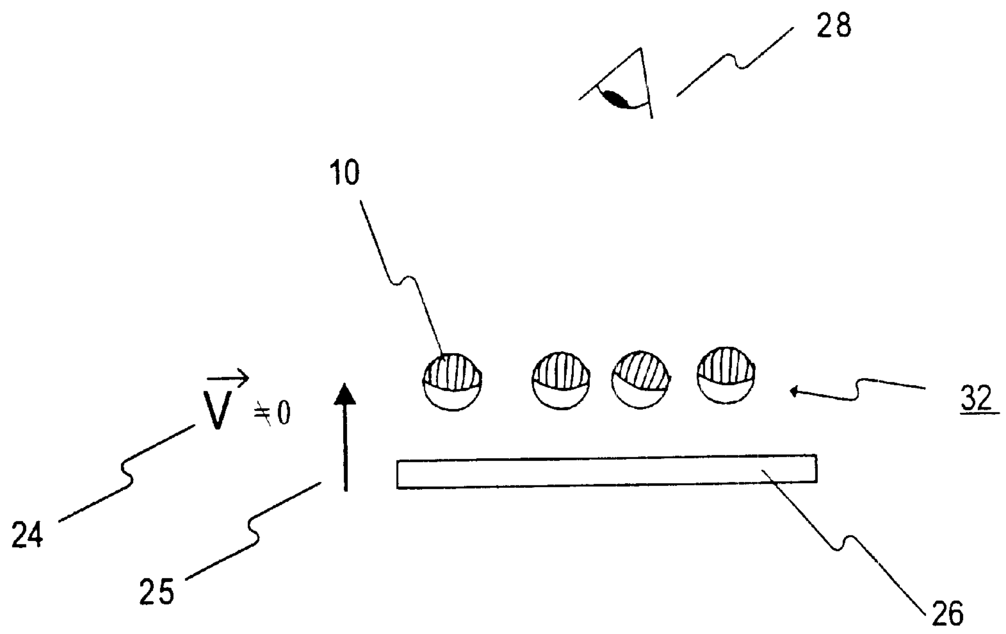
FIG. 4 (Prior Art)
FIG. 4 depicts the exemplary system of FIG. 3 in the presence of a non-zero addressing vector field.
Figure 5:
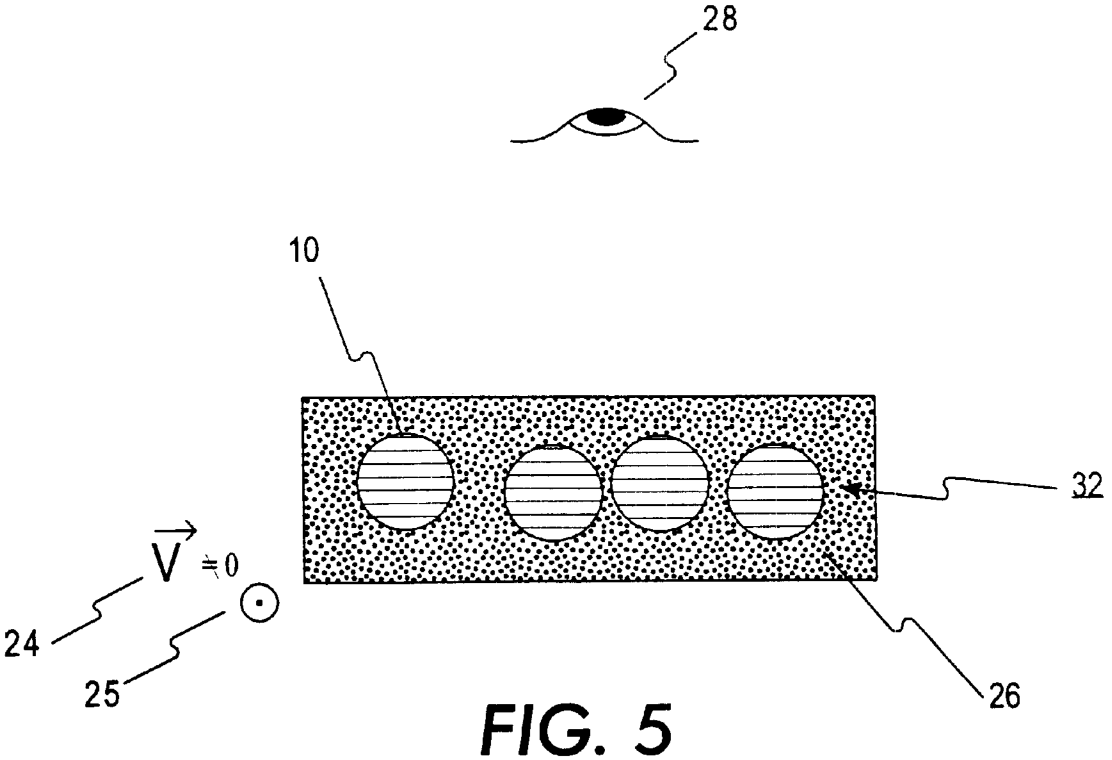
FIG. 5 (Prior Art)
FIG. 5 depicts an alternate view of the exemplary system of FIG. 4.
Figure 6:
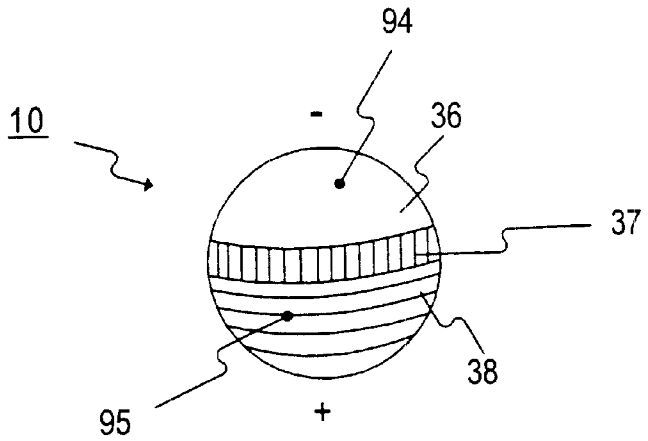
FIG. 6 (Prior Art)
FIG. 6 depicts an exemplary rotatable element of the prior art with a multivalued aspect.
Figure 7:
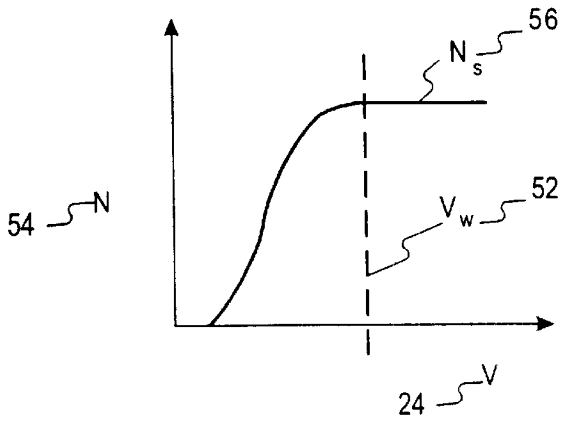
FIG. 7 (Prior Art)
FIG. 7 depicts an exemplary graph of the number of rotatable elements that change orientation as a function of applied vector field of the prior art, displaying work function and saturation number

The present invention relates to rotating element sheet material with a generalized containment structure and methods of fabricating such rotating element sheet material.

Reference will now be made in detail to an implementation consistent with the present invention as illustrated in the accompanying drawings. Whenever possible, the same reference number will be used throughout the drawings and the following description to refer to the same or like parts.

V.A. Definitions

As used herein, "aspect" refers to a common response to incident electromagnetic energy of interest. For example, if the incident electromagnetic energy of interest lies in the visible spectrum, then a first aspect can correspond to a black appearance, and a second aspect can correspond to a white appearance. If the incident electromagnetic energy of interest lies in the x-ray region, then a first aspect can correspond to the transmission of the x-ray energy, while a second aspect can correspond to the absorption of the x-ray energy. Furthermore, the "common response" can comprise any of the phenomena of absorption, reflection, polarization, transmission, fluorescence, or any combination thereof.

As used herein, "observer" refers to a human perceiver, or to a human perceiver in conjunction with an apparatus sensitive to the electromagnetic energy of interest. If the electromagnetic energy of interest lies in the visible spectrum, then observer can refer to a human perceiver. If the electromagnetic energy of interest lies outside of the visible spectrum, then observer refers to an apparatus sensitive to the electromagnetic energy and capable of resolving the aspects of interest into human perceivable form.

As used herein, "vector field" refers to a field whose amplitude in space is capable of having a magnitude and a direction. Vector fields of interest in the present invention include electric fields, magnetic fields, electromagnetic fields, or gravitational fields.

As used herein, "work function" refers to the amount of energy necessary to overcome the attraction between a rotatable element and containment structure so as to enable a change of orientation. A host of factors influence the magnitude of the energy associated with the work function including, but not limited to: surface tension of enabling fluid in contact with rotatable elements; the relative specific gravity of enabling fluid and rotatable element; magnitude of charge on rotatable element; relative electronic permittivity of enabling fluid and containment structure; "stickiness" of containment structure; and other residual vector fields that may be present.

As used herein, "matrix" refers a to a structure in which elements of interest are enclosed or embedded in interstitial regions. For example, "fibrous matrix" refers to a structure resembling or nearly resembling intertwined fibers, and in which elements of interest are contained in interstitial regions. For example, a structure comprising intertwined fibers where elements of interest are contained in interstitial regions is a "fibrous matrix" structure. Elements of interest may comprise, and are not limited to, rotatable elements, micro-capsules, enabling fluid, and solid-forming material such as epoxy.

As used herein, "relative refractive index," when used with respect to a first material and a second material, refers to the ratio of the speed of the transmitted electromagnetic energy of interest in the first material to the speed of the transmitted electromagnetic energy of interest in the second material. As used herein, the "refractive index" of a material is the ratio of the speed of the transmitted electromagnetic energy of interest in the material to the speed of the transmitted electromagnetic energy of interest in a vacuum. The electromagnetic energy of interest can include, but is not limited to, the spectrum associated with visible light, x-rays, ultraviolet, or infrared radiation.

As used herein, "degree of birefringence" refers to the relative difference between the refractive index of a material along a first axis and the refractive index of the same material along a second axis.

As used herein, "transparent" refers to a material that is transmissive to electromagnetic energy of interest without significant deviation or absorption. It is not intended to be limited only to the spectrum of electromagnetic energy associated with visible light.

As used herein, "windowing" material is material that is transparent to electromagnetic energy of interest and is rigid or nearly rigid, as plastic or glass.

As used herein, "pulp slurry" refers to the mixture of cellulose material and liquid used to manufacture paper, as well as any equivalents as are conventionally known.

V.B. Generalized containment structure 1

Figure 8:
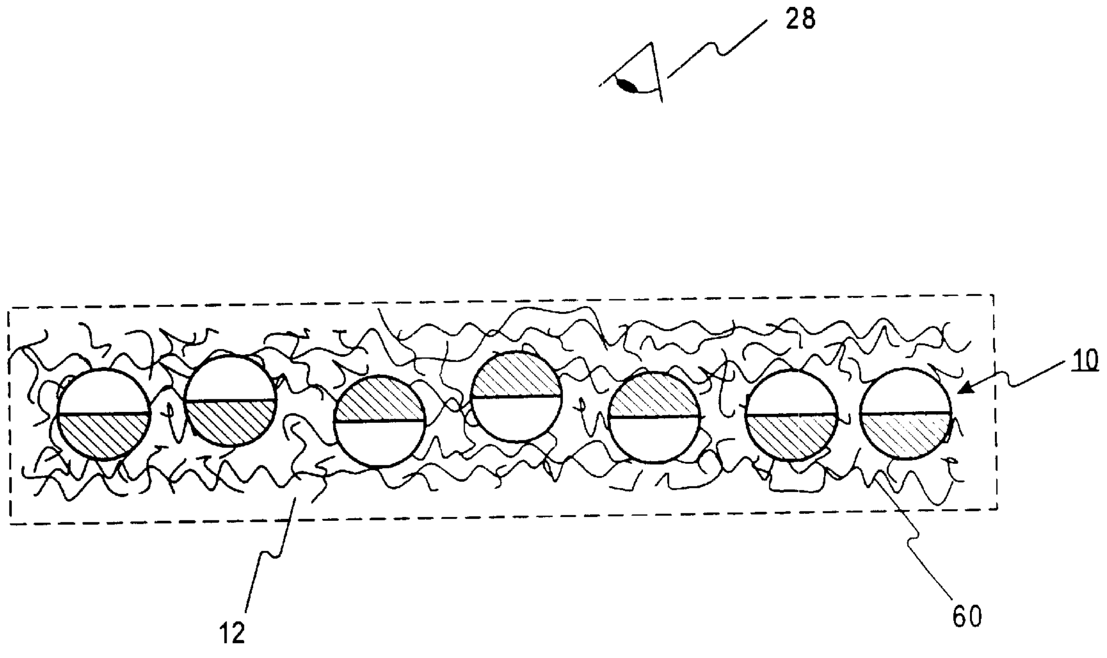
FIG. 8 depicts a fibrous matrix as an exemplary generalized containment structure consistent with the first embodiment of the present invention.

A first embodiment of the present invention is depicted in FIG. 8 where fibrous matrix 60 is a plurality of paper fibers. In FIG. 8, fibrous matrix 60 makes contact with and supports rotatable elements 10. Also contained within fibrous matrix 60 is enabling fluid 12. The dotted line indicates the boundary of fibrous matrix 60 and enabling fluid 12, where, for example, some restraining means (not shown) keeps enabling fluid 12 within fibrous matrix 60 and around rotatable elements 10. Fibrous matrix 60 restricts the translational motion of rotatable elements 10. Translational motion of rotational elements 10 can occur as a result of any applied or stray vector field that may be present. An example of a stray vector field that is present is the field associated with the gravitational force. In a large-area-display application, the force associated with the gravitational force will appreciably affect the appearance of the display. An example of an applied vector field is the field that is responsible for addressing the rotatable elements, such as an electric field.

Fibrous matrix 60 also restricts, but to a lesser extent, the rotational motion of rotatable elements 10. Sufficiently strong vector fields for addressing, such as electric fields, can overcome the work function associated with the rotation of the rotatable elements 10 within fibrous matrix 60. In a preferred embodiment of the present invention, fibrous matrix 60 is selected such that there is an appreciable work function associated with the rotation of rotatable elements 10 within fibrous matrix 60. Thus, in the preferred embodiment discussed here, there will be a high aspect stability.

Figure 9:
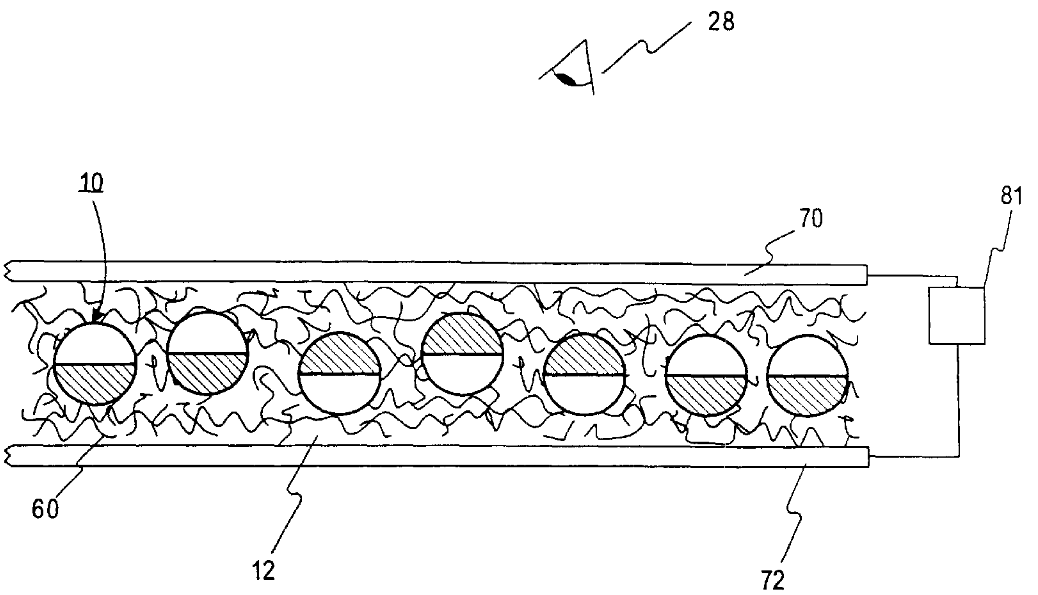
FIG. 9 depicts the exemplary generalized containment structure of FIG. 8 including first overlay, second overlay, and an exemplary addressor.

FIG. 9 depicts the generalized containment structure substrate of FIG. 8, first overlay 70, second overlay 72, a representation of addressor 81, and enabling fluid 12. First overlay 70, in a preferred embodiment of the present invention, is transparent or semi-transparent to the incident electromagnetic energy of interest, and, with second overlay 72, may contain means for addressing rotatable elements 10. First overlay 70 and second overlay 72 may also serve to keep enabling fluid 12 within fibrous matrix 60 and around rotatable elements 10. If the incident electromagnetic energy of interest is visible light, then first overlay 70 may be a glass surface, while second overlay 72 may be a white-colored material such as plastic containing titanium dioxide pigment and glass with white paper backing, where the white-paper backing is not in contact with the region between first overlay 70 and second overlay 72. One skilled in the art will appreciate that first overlay 70 and second overlay 72 may comprise any number of materials including polyester, glass or other windowing, transparent, or semi-transparent materials, as well as conductive materials in order to address rotatable elements 10. Addressor 81, first overlay 70, and second overlay 72, in a preferred embodiment, include any of the techniques or systems disclosed in: U.S. Pat. No. 5,739,801, herein incorporated by reference, relating to a multi-threshold work function and addressing means; U.S. Pat. No. 5,724,064, herein incorporated by reference, relating to a means for addressing; U.S. Pat. No. 5,717,515, hereinabove incorporated by reference, relating to a canted vector field for addressing; U.S. Pat. No. 5,389,945, hereinabove incorporated by reference, relating to a wand-type device for addressing; and U.S. Pat. No. 4,126,854 hereinabove incorporated by reference, relating to various types of addressing grids. Although FIG. 9 depicts first overlay 70 and second overlay 72 as separated by fibrous matrix 60, one skilled in the art will appreciate that first overlay 70 and second overlay 72 are preferably joined so as to envelope fibrous matrix 60, enabling fluid 12, and rotatable elements 10. Furthermore, when addressor 81, first overlay 70, and second overlay 72 include addressing systems as described above, and when first overlay 70 and second overlay 72 are so joined, the material connecting first overlay 70 to second overlay 72 is preferably nonconductive.

V.B. 1. Degree of birefringence in the fibrous matrix

Figure 10:
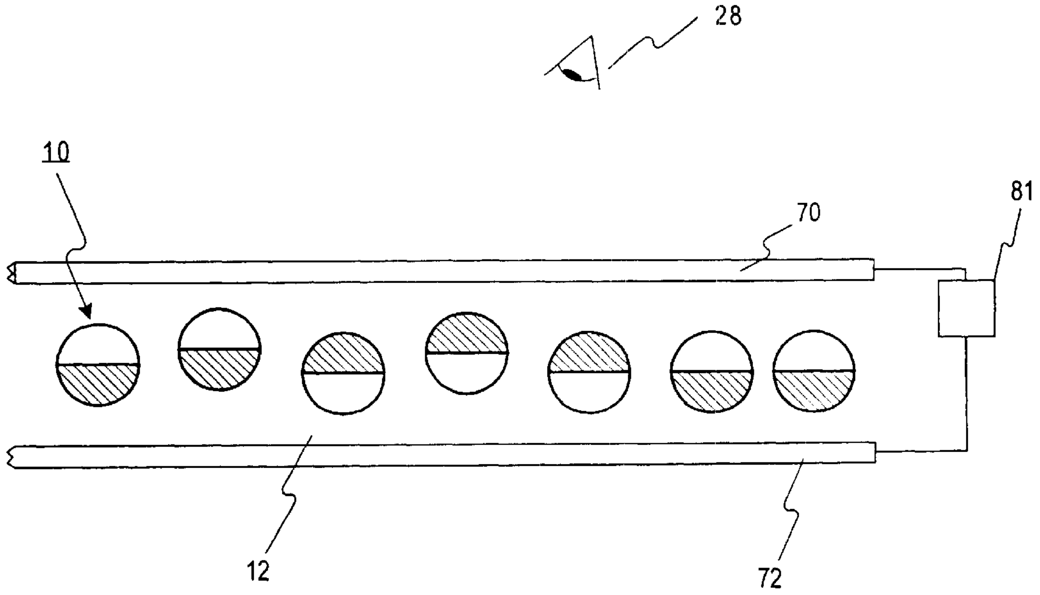
FIG. 10 depicts the system of FIG. 9 and an enabling fluid where the relative refractive index of the enabling fluid and the fibrous matrix is unity, or near unity.

In a preferred embodiment of the present invention, the relative refractive index of enabling fluid 12 and fibrous matrix 60 is unity, or near unity. This renders fibrous matrix 60 transparent to the incident electromagnetic energy of interest. This transparency is depicted in FIG. 10 by showing rotatable elements only in the region between first overlay 70 and second overlay 72.

When selecting fibrous material for fibrous matrix 60 in the current embodiment, it is desirable to use fibrous material that does not exhibit birefringence. Fibrous materials that exhibit birefringence will exhibit different values of refractive index from different observer 28 perspectives. In particular, a birefringent material exhibits not a single isotropic refractive index but two values. Since common fluids have a single refractive index it is impossible to match the refractive indices of such fibrous material to a single fluid. If the degree of birefringence is not too great, as with cellulose material, an acceptable trade-off may be found for some applications, due to the inexpensive nature of cellulose material. This is discussed more below.

Polyester materials, in general, tend to exhibit a high degree of birefringence. In contrast, cellulose materials tend to exhibit a significantly lower degree of birefringence, with typical values for the refractive index along different crystal axes of 1.618 and 1.544. Furthermore, acrylic materials and cellulose acetate materials exhibit a very low degree of birefringence. Cellulose acetate material has effectively a single refractive index value of 1.475 and becomes essentially invisible when immersed in mineral oil.

Since birefringence is a property associated with the degree of crystallinity of the polymer, it tends to disappear with a loss in crystal properties. Polymers tend to be crystalline if they are comprised of equal sized molecules and to become amorphous as the range of molecular sizes becomes large. Thus, crystalline polyethylene can have refractive indices of 1.520 and 1.582 but amorphous polyethylene, with a broad range of molecular sizes, will typically have a single refractive index of 1.49. Thus, fibrous material composed of many polymer fibers can be used when the polymer fibers are caused to have amorphous properties.

Because of its generally amorphous structure, glass materials tend not to exhibit birefringence, except under stress. Thus borosilicate glass, with a single refractive index of 1.5097, will tend to become invisible in benzene.

In addition, an enabling fluid with any desired value of refractive index may be obtained by mixing together in the proper proportion an enabling fluid of higher refractive index with an enabling fluid of lower refractive index. Thus, enabling fluids with refractive indices that closely match the refractive index of any transparent material are easily obtained.

Although the preferred embodiment described above for the generalized containment structure is based upon a fibrous matrix that comprises any of cellulose acetate fibers, borosilicate glass, and amorphous polyethylene, one skilled in the art will appreciate that a fibrous matrix may comprise any such material and structure consistent with the present invention.

V.C. Generalized containment structure 2

Figure 11:
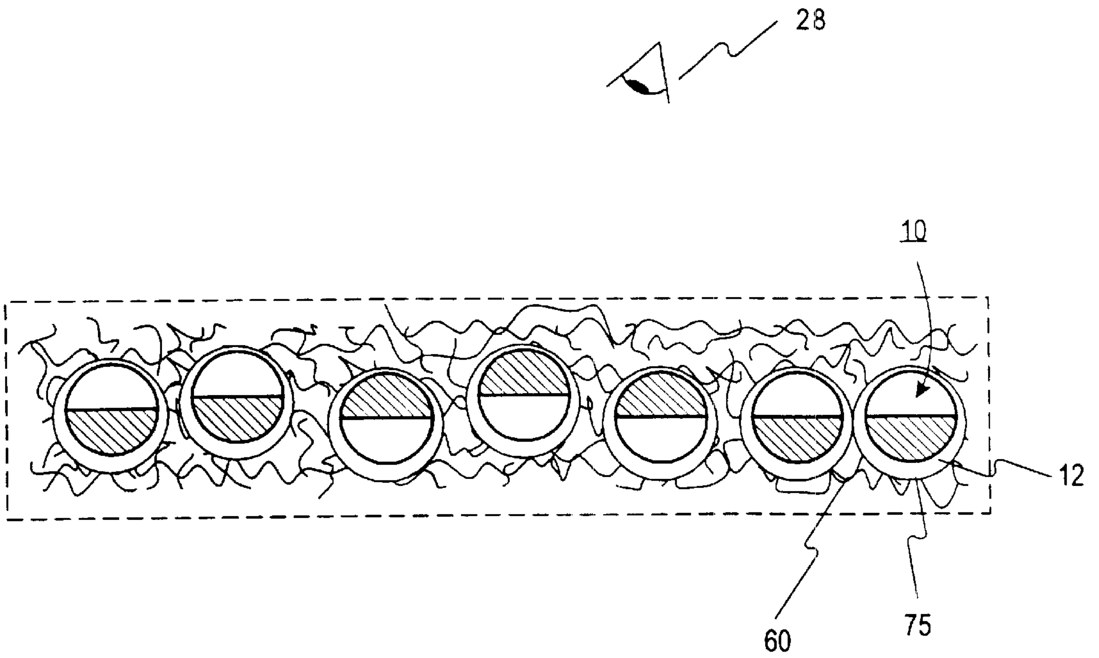
FIG. 11 depicts a fibrous matrix structure supporting micro-capsules as an exemplary generalized containment structure consistent with the second embodiment of the present invention.

A second embodiment of the present invention is depicted in FIG. 11. FIG. 11 depicts fibrous matrix 60, micro-capsules 75, rotatable elements 10, and enabling fluid 12. Although FIG. 11 depicts micro-capsules 75 that are spherical in shape and that contain only one rotatable element per micro-capsule, one skilled in the art will appreciate that micro-capsules 75 may be any convenient shape or structure, and may contain more than one rotatable element 10.

Micro-capsules 75 are made from material such as gelatin and are hollow within in order to accommodate rotatable elements 10 and enabling fluid 12. The work function associated with the rotational motion of rotatable elements 10 within micro-capsules 75 is a function of the properties of micro-capsules 75, enabling fluid 12, and rotatable elements 10. The work function in this embodiment of the present invention will not be a function of the properties of fibrous matrix 60. This can be advantageous when the material ideally suited to function as fibrous matrix 60 has properties that are not favorable to a suitable work function, or when there are problems associated with containing enabling fluid 12 within fibrous matrix 60.

Figure 12:
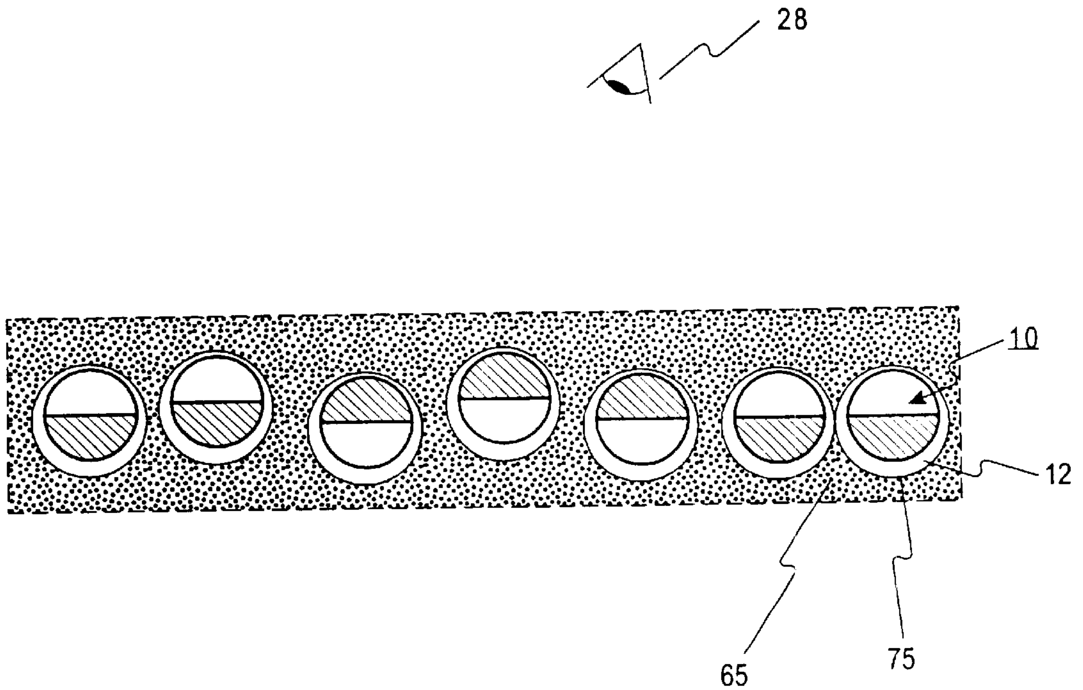
FIG. 12 depicts a fibrous matrix structure supporting micro-capsules and an additional supporting material, where the relative refractive index of the additional supporting material and the fibrous matrix structure is unity, or near unity.

Since enabling fluid 12 is now inside micro-capsule 75, the fluid that is in the interstitial region of fibrous matrix 60 may be selected to be a solid-forming material, such as epoxy, and that hardens to a refractive index equal to that of fibrous matrix 60. This is depicted in FIG. 12. Fibrous matrix 60 then performs the useful function of strengthening the resultant sheet and providing a low cost structure to maintain the relative positions of the plurality of micro-capsules 75 until the hardening of interstitial fluid 65 occurs.

V.D. Method for fabricating generalized containment structure 1

Rotatable elements 10 are manufactured by any convenient means. For example, U.S. Pat. No. 5,262,098 and U.S. Pat. No. 5,919,409, both hereinabove incorporated by reference, disclose methods for fabricating rotatable elements 10.

Following such manufacture, rotatable elements 10 are mixed in with paper pulp slurry containing fibers that exhibit a low degree of birefringence. Methods of incorporating micron-sized objects into paper have been previously disclosed, for example, in U.S. Pat. No. 3,293,114, relating to paper with increased stiffness and caliper, in U.S. Pat. No. 4,046,404, relating to carbonless copy paper, and in U.S. Pat. No. 5,125,996, relating to a relief-imaging paper, all of which are herein incorporated by reference.

The pulp slurry is processed into paper by any convenient means known in the art. As the water leaves the pulp slurry, the cellulose fibers will tightly enmesh rotatable elements 10 and form fibrous matrix 60 containing rotatable elements 10. This is subsequently dried. As enabling fluid 12 is later infused into fibrous matrix 60, there will be a slight swelling of the space surrounding rotatable elements 10, allowing rotational motion. To cause controlled stiction of rotational elements 10, a few percent concentration of fibrous material that retains its springiness, but ideally has the same optical properties as the pulp fibers, may be added to the pulp slurry.

V.E. Method for fabricating generalized containment structure 2

In a second embodiment of a method for assembling rotating element sheet material with a generalized containment structure, rotatable elements 10 are manufactured by any convenient means as described above, including, but not limited to those disclosed in U.S. Pat. No. 5,262,098 and U.S. Pat. No. 5,919,409, both hereinabove incorporated by reference. Rotatable elements 10 and enabling fluid 12 are then contained within micro-capsules 75. A preferred process of including rotatable elements 10 and enabling fluid 12 into micro-capsules 75 includes that disclosed in U.S. Pat. No. 5,604,027, herein incorporated by reference.

Next, micro-capsules 75, containing rotatable elements 10 and enabling fluid 12, are dispersed into pulp slurry as described above. Again, means for including micron-sized material into paper has previously been disclosed in U.S. Pat. No. 3,293,114, U.S. Pat. No. 4,046,404, and U.S. Pat. No. 5,125,996, both hereinabove incorporated by reference, and described above.

Furthermore, since enabling fluid 12 is now inside micro-capsule 75, the fluid that is in the interstitial region of fibrous matrix 60 may be selected to be a solid-forming material, such as epoxy, and that hardens to a refractive index equal to that of fibrous matrix 60. Fibrous matrix 60 then performs the useful function of strengthening the resultant sheet and providing a low cost structure to maintain the relative positions of the plurality of micro-capsules 75 until the hardening of the interstitial fluid occurs. Thus, a fluid may be infused in the interstitial region of fibrous matrix 60 that is a solid-forming material, such as epoxy. The interstitial fluid is then hardened by any conventional means known in the art, such as heating.

V.F. Method for fabricating generalized containment structure 3

In a third embodiment of the present invention, rotatable elements 10 are manufactured by any convenient means, as above. For example, U.S. Pat. No. 5,262,098 and U.S. Pat. No. 5,919,409, both hereinabove incorporated by reference, disclose methods for fabricating rotatable elements 10.

Figure 13:
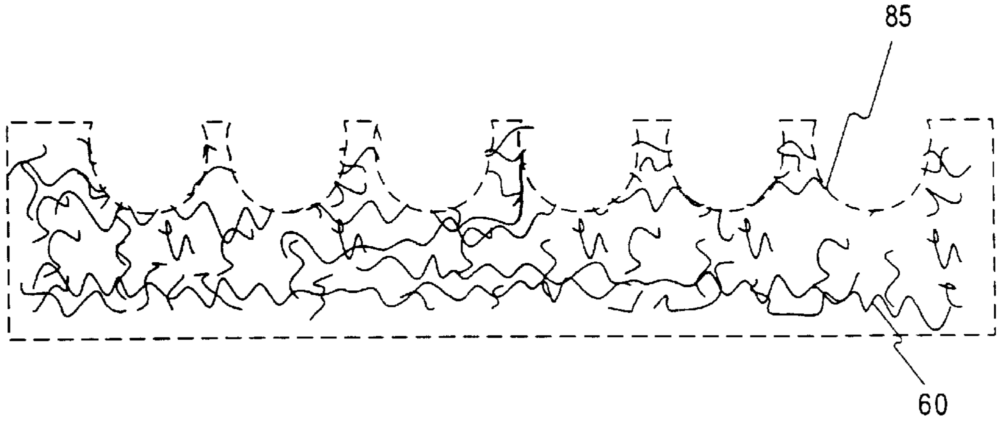
FIG. 13 depicts an exemplary cross section view of an embossed fibrous matrix consistent with the third and fourth embodiments of a method for assembling rotating element sheet material of the present invention.

Next, dry fibers are agglomerated by any conventional means known in the art. Fibrous matrix 60 is formed by pressing agglomerated dry fibers into the form of a sheet or other preferred shape using a mechanical embossing tool that both compresses the agglomerated dry fibers into sheet form and creates a plurality of pocket-shaped micro-cavities in the fibrous matrix 60, using both heat and pressure. Such an embossed fibrous matrix 60 is depicted in FIG. 13, depicting pocket-shaped micro-cavities 85. Although FIG. 13 depicts pocket-shaped micro-cavities 85 as generally spherical, one skilled in the art will appreciate that a variety of shapes are possible, including square, cylindrical, and others.

For the case when fibrous matrix 60 comprises glass fibers, the embossing temperature will be that of the softening point of the glass fibers. For the case when fibrous matrix 60 comprises cellulose acetate, in a preferred embodiment of the present invention, the cellulose acetate is first slightly moistened by acetone, and the embossing pressure will then force the cavity-forming fibers into contact with each other. In this embodiment of the present invention, the embossing temperature will remove the acetone and cause the fibers in contact with one another to be cemented together.

Rotatable elements 10 are then placed in pocket-shaped micro-cavities 85 by any conventional means known in the art, and pocket-shaped micro-cavities 85 are sealed by laminating a layer of fibrous material in sheet form over the surface of embossed fibrous matrix 60. Alternatively, the open tops of pocket-shaped micro-cavities 85 may be closed by applying embossed fibrous matrix 60 between first overlay 70 and second overlay 72, where first overlay 70 and second overlay 72 are selected to serve as suitable containment windows.

V.G. Method for fabricating generalized containment structure 4

In a fourth embodiment of the present invention, rotatable elements 10 are manufactured by any convenient means as described above, including, but not limited to those disclosed in U.S. Pat. No. 5,262,098 and U.S. Pat. No. 5,919,409, both hereinabove incorporated by reference. Rotatable elements 10 and enabling fluid 12 are then contained within micro-capsules 75. A preferred process of including rotatable elements 10 and enabling fluid 12 into micro-capsules 75 includes that disclosed in U.S. Pat. No. 5,604,027, hereinabove incorporated by reference.

Next, dry fibers are agglomerated by any conventional means known in the art. Fibrous matrix 60 is formed by pressing the agglomerated dry fibers into the form of a sheet or other preferred shape using a mechanical embossing tool that both compresses the fibers into sheet form and creates a plurality of pocket-shaped micro-cavities in the fibrous matrix sheet, using both heat and pressure. Again, such an embossed fibrous matrix 60 is depicted in FIG. 13, depicting pocket-shaped micro-cavities 85. Although FIG. 13 depicts pocket-shaped micro-cavities 85 as generally spherical, one skilled in the art will appreciate that a variety of shapes are possible, including square, cylindrical, and others.

Again, for the case when fibrous matrix 60 comprises glass fibers, the embossing temperature will be that of the softening point of the glass fibers. For the case when fibrous matrix 60 comprises cellulose acetate, in a preferred embodiment of the present invention, the cellulose acetate is first slightly moistened by acetone, and the embossing pressure will then force the cavity-forming fibers into contact with each other. In this embodiment of the present invention, the embossing temperature will remove the acetone and cause the fibers in contact with one another to be cemented together.

Micro-capsules 75 are then placed in pocket-shaped micro-cavities 85 by any conventional means known in the art, and pocket-shaped micro-cavities 85 are sealed by laminating a layer of fibrous material in sheet form over the surface of embossed fibrous matrix 60. Alternatively, the open tops of pocket-shaped micro-cavities 85 may be closed by applying embossed fibrous matrix 60 between first overlay 70 and second overlay 72, where first overlay 70 and second overlay 72 are selected to serve as suitable containment windows.

Again, since enabling fluid 12 is now inside micro-capsule 75, the fluid that is in the interstitial region of fibrous matrix 60 may be selected to be a solid-forming material, such as epoxy, and that hardens to a refractive index equal to that of embossed fibrous matrix 60. Embossed fibrous matrix 60 then performs the useful function of strengthening the resultant sheet and providing a low cost structure to maintain the relative positions of the plurality of micro-capsules 75 until the hardening of the interstitial fluid occurs. Thus, a fluid may be infused in the interstitial region of embossed fibrous matrix 60 that is a solid-forming material, such as epoxy. The interstitial fluid is then hardened by any conventional means known in the art, such as heating.

V.H. Method for fabricating generalized containment structure 5

In a fifth embodiment of the present invention, a method for assembling rotating element sheet material comprises manufacturing rotatable elements 10 by any convenient means, as above. For example, U.S. Pat. No. 5,262,098 and U.S. Pat. No. 5,919,409, both hereinabove incorporated by reference, disclose methods for fabricating rotatable elements 10.

The method then includes weaving a fibrous matrix sheet that defines preferred interstitial regions using a loom or other method of assembling a fabric that enables placement of fibers in preferred patterns. The preferred interstitial region, for example, may define a significantly larger-than-average cavity within the fibrous matrix sheet. The rotatable elements are subsequently placed in the preferred interstitial regions by any conventional means known in the art, and the preferred interstitial regions sealed by a second fibrous matrix sheet or with windowing material, as previously described.

Figure 14:
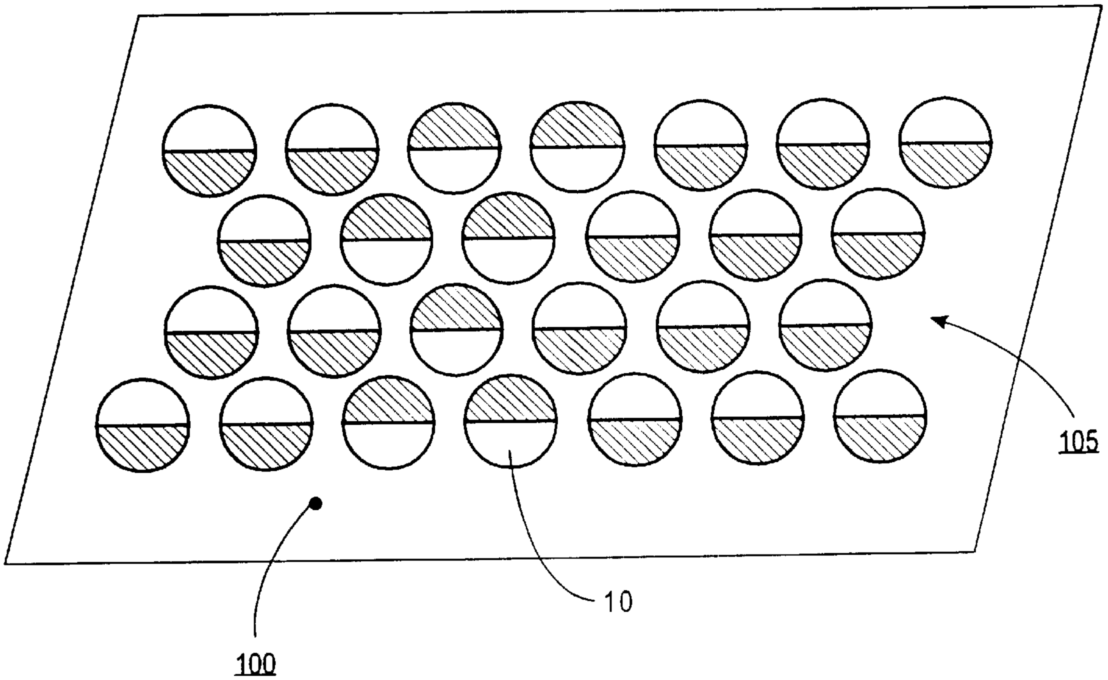
FIG. 14 depicts rotatable elements in an exemplary preferred spatial configuration prior to "flocking," consistent with the fifth and sixth embodiments of a method for assembling rotating element sheet material of the present invention.
Figure 15:
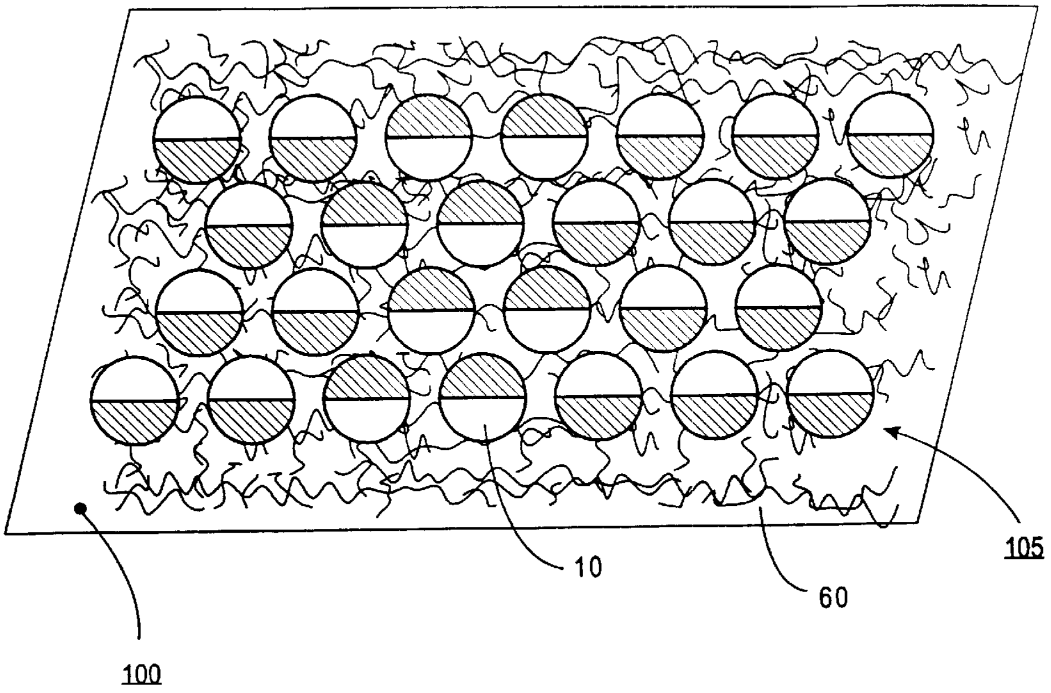
FIG. 15 depicts the rotatable elements of FIG. 14 and the encapsulating fibrous matrix formed by "flocking" consistent with the present invention.

Alternatively, the rotating elements may be placed on and lightly adhered to a surface in a preferred spatial configuration. This is depicted in FIG. 14, indicating surface 100, rotatable element 10, and preferred spatial configuration 105. One skilled in the art will appreciate that preferred spatial configuration 105 may include any configuration. The fibrous material may then be placed around the rotatable elements to form fibrous matrix 60 with rotatable elements in the interstitial region. This is depicted in FIG. 15 indicating fibrous matrix 60. The placement of the fibrous material may be done by the above described loom method, or it may be done by projecting the fibrous material in a random manner onto the surface and around the rotatable elements using electrostatic fields, air flow or other fibrous-material moving means. The electrostatic means are known in the art as "flocking." This encapsulation of rotatable elements 10 in fibrous matrix 60 then creates fibrous matrix 60 that fully contains rotatable elements 10 upon removal of the fibrous matrix 60 from surface 100.

V.I. Method for fabricating generalized containment structure 6

Further still, in a sixth embodiment of the present invention, a method for assembling rotating element sheet material comprises manufacturing rotatable elements 10 by any convenient means as described above, including, but not limited to those disclosed in U.S. Pat. No. 5,262,098 and U.S. Pat. No. 5,919,409, both hereinabove incorporated by reference. Rotatable elements 10 and enabling fluid 12 are then contained within micro-capsules 75. A preferred process of including rotatable elements 10 and enabling fluid 12 into micro-capsules 75 includes that disclosed in U.S. Pat. No. 5,604,027, hereinabove incorporated by reference.

The method then includes weaving a fibrous matrix sheet that defines preferred interstitial regions using a loom or other method of assembling a fabric that enables placement of fibers in preferred patterns. The preferred interstitial region, for example, may define a significantly larger-than-average cavity within the fibrous matrix sheet. The micro-capsules are subsequently placed in the preferred interstitial regions by any conventional means known in the art, and the preferred interstitial regions sealed by a second fibrous matrix sheet or with windowing material, as previously described.

Alternatively, the micro-capsules may be placed on and lightly adhered to a surface in a preferred spatial configuration, as was described above with respect to rotatable elements. The fibrous material may then be placed around the micro-capsules to form fibrous matrix 60 with micro-capsules in the interstitial region. The placement of the fibrous material may be done by the above described loom method, or it may be done by projecting the fibrous material in a random manner onto the surface and around the micro-capsules using electrostatic fields, air flow or other fibrous-material moving means. The electrostatic means are known in the art as "flocking." This encapsulation of the micro-capsules in fibrous matrix 60 then creates a fibrous matrix that fully contains the micro-capsules upon removal of the fibrous matrix from the surface.

Again, since enabling fluid 12 is now inside micro-capsule 75, the fluid that is in the interstitial region of fibrous matrix 60 may be selected to be a solid-forming material, such as epoxy, and that hardens to a refractive index equal to that of fibrous matrix 60. Fibrous matrix 60 then performs the useful function of strengthening the resultant sheet and providing a low cost structure to maintain the relative positions of the plurality of micro-capsules 75 until the hardening of the interstitial fluid occurs. Thus, a fluid may be infused in the interstitial region of fibrous matrix 60 that is a solid-forming material, such as epoxy. The interstitial fluid is then hardened by any conventional means known in the art, such as heating.

V.J. Conclusion

Methods and apparatus consistent with the present invention can be used to prepare rotating element sheet material with a generalized containment structure substrate. The foregoing description of implementations of the invention has been presented for purposes of illustration and description. It is not exhaustive, it is not intended to describe all such means as would occur to one skilled in the art, and does not limit the invention to the precise form disclosed. Modifications and variations are possible in light of the above teachings or may be acquired from practicing the invention. For example, some of the examples used the spectrum associated with visible light as the electromagnetic energy of interest. However, the use of any electromagnetic energy, including infrared, ultraviolet and x-rays as the electromagnetic energy of interest is consistent with the present invention. In addition, the preferred embodiments described fibrous matrix 60 as composed of any of a plurality of paper fibers, cellulose acetate fibers, borosilicate glass, and amorphous polyethylene. However, any matrix structure with interstitial regions composed of material with a suitably low degree of birefringence will function as well. Accordingly, the invention is not limited to the above-described embodiments, but instead is defined by the appended claims in light of their full scope of equivalents.

What is claimed is:

1. Rotating element sheet material comprising:

a fibrous matrix;

enabling fluid; and a plurality of rotatable elements disposed within said fibrous matrix and in contact with said enabling fluid;

wherein each of said plurality of rotatable elements exhibits:

a first collection of responses to incident electromagnetic radiation of interest; and an addressing polarity.

2. The rotating element sheet material of claim 1 wherein said fibrous matrix comprises a material with a low degree of birefringence.

3. The rotating element sheet material of claim 1 wherein said fibrous matrix comprises a plurality of fibers of a material;

wherein said material is selected from one of: cellulosic fibers, cellulose acetate fibers, acrylic fibers, glass fibers, and borosilicate glass fibers.

4. The rotating element sheet material of claim 1, 2, or 3 wherein the relative refractive index of said enabling fluid and said fibrous matrix is unity or near unity.

5. The rotating element sheet material of claim 4 further comprising:

first overlay; and second overlay;

wherein said first overlay comprises a transparent or semi-transparent material;

wherein said second overlay comprises a transparent or semi-transparent material; and wherein said first overlay and said second overlay envelope said fibrous matrix, said enabling fluid, and said plurality of rotatable elements.

6. The rotating element sheet material of claim 5 further comprising:

an addressor;

wherein said addressor, said first overlay, and said second overlay include an addressing system;

wherein said addressing system introduces addressing vector fields capable of influencing the orientation of a subset of said plurality of rotatable elements due to said addressing polarity of said rotatable elements.

7. Rotating element sheet material comprising:

a containment structure;

enabling fluid; and a plurality of rotatable elements disposed within said containment structure and in contact with said enabling fluid;

wherein each of said plurality of rotatable elements exhibits:

a first collection of responses to incident electromagnetic radiation of interest; and an addressing polarity; and wherein said containment structure comprises a fibrous matrix, and a plurality of micro-capsules;

wherein each of said plurality of micro-capsules defines a space therein, wherein said space contains said enabling fluid and a subset of said plurality of rotatable elements.

8. The rotating element sheet material of claim 7 wherein said fibrous matrix comprises a material with a low degree of birefringence.

9. The rotating element sheet material of claim 7 wherein said fibrous matrix comprises a plurality of fibers of a material;

wherein said material is selected from one of: cellulosic fibers, cellulose acetate fibers, acrylic fibers, glass fibers, and borosilicate glass fibers.

10. The rotating element sheet material of claim 7, 8, or 9 wherein said containment structure further comprises additional supporting material.

11. The rotating element sheet material of claim 10 further comprising:

first overlay; and second overlay;

wherein said first overlay comprises a transparent or semi-transparent material;

wherein said second overlay comprises a transparent or semi-transparent material; and wherein said first overlay and said second overlay envelope said fibrous matrix, said enabling fluid, and said plurality of rotatable elements.

12. The rotating element sheet material of claim 11 further comprising:

an addressor;

wherein said addressor, said first overlay, and said second overlay include an addressing system;

wherein said addressing system introduces addressing vector fields capable of influencing the orientation of a subset of said plurality of rotatable elements due to said addressing polarity of said rotatable elements.

13. The rotating element sheet material of claim 10 where said additional supporting material is a solid-forming material.

14. The rotating element sheet material of claim 10 where said additional supporting material is a solid-forming material, and where the relative refractive index of said additional supporting material and said fibrous matrix is unity or near unity.

15. A method for assembling rotating element sheet material using a plurality of rotatable elements, using enabling fluid, and using a collection of fibrous material, where said rotating element sheet material comprises said plurality of rotatable elements and said enabling fluid interstitially contained within a fibrous matrix, and where said enabling fluid is in contact with said plurality of rotatable elements;

said method comprising the steps of:

providing said collection of fibrous material;

dispersing said plurality of rotatable elements into said collection of fibrous material;

performing a first manipulation of said fibrous material such that said fibrous material forms said fibrous matrix;

dispersing said enabling fluid into said fibrous matrix.

16. The method of claim 15 wherein said fibrous matrix comprises a material with a low degree of birefringence.

17. The method of claim 15 wherein said fibrous matrix comprises a plurality of fibers of a material;

wherein said material is selected from one of: cellulosic fibers, cellulose acetate fibers, acrylic fibers, glass fibers, and borosilicate glass fibers.

18. A method for assembling rotating element sheet material using a plurality of rotatable elements, using enabling fluid, and using a collection of fibrous material;

where said rotating element sheet material comprises said plurality of rotatable elements and said enabling fluid encapsulated within a plurality of micro-capsules, where said enabling fluid is in contact with said plurality of rotatable elements, and where said plurality of micro-capsules are interstitially contained within a fibrous matrix;

said method comprising the steps of:

encapsulating said plurality of rotatable elements and said enabling fluid within said plurality of micro-capsules;

providing said collection of fibrous material;

dispersing said plurality of micro-capsules into said collection of fibrous material;

performing a first manipulation of said fibrous material such that said fibrous material forms said fibrous matrix.

19. The method of claim 18, said method further comprising:

performing a second manipulation of said rotating element sheet material wherein additional supporting material is interstitially contained within said fibrous matrix.

20. The method of claim 18, said method further comprising:

performing a second manipulation of said rotating element sheet material wherein additional supporting material is interstitially contained within said fibrous matrix;

said additional supporting material is a solid-forming material, and performing a third manipulation of said additional supporting material such that said additional supporting material is hardened.

21. The method of claim 18 wherein said fibrous matrix comprises a material with a low degree of birefringence.

22. The method of claim 18 wherein said fibrous matrix comprises a plurality of fibers of a material;

wherein said material is selected from one of: cellulosic fibers, cellulose acetate fibers, acrylic fibers, glass fibers, and borosilicate glass fibers.

23. A method for assembling rotating element sheet material using a plurality of rotatable elements, using enabling fluid, and using a collection of fibrous material, where said rotating element sheet material comprises said plurality of rotatable elements and said enabling fluid interstitially contained within a fibrous matrix, and where said enabling fluid is in contact with said plurality of rotatable elements;

said method comprising the steps of:

providing said collection of fibrous material;

performing a first manipulation of said fibrous material such that said fibrous material forms said fibrous matrix defining a plurality of preferred interstitial regions;

performing a second manipulation of said fibrous matrix and said plurality of rotatable elements such that said plurality of rotatable elements are dispersed to said preferred interstitial regions of said fibrous matrix; and performing a third manipulation of said fibrous matrix and said plurality of rotatable elements wherein said enabling fluid i s interstitially contain ed within said fibrous matrix.

24. The method of claim 23 wherein said fibrous matrix comprises a material with a low degree of birefringence.

25. The method of claim 23 wherein said fibrous matrix comprises a plurality of fibers of a material;

wherein said material is selected from one of: cellulosic fibers, cellulose acetate fibers, acrylic fibers, glass fibers, and borosilicate glass fibers.

26. A method for assembling rotating element sheet material using a plurality of rotatable elements, using enabling fluid, and using a collection of fibrous material, where said rotating element sheet material comprises said plurality of rotatable elements and said enabling fluid encapsulated within a plurality of micro-capsules, where said enabling fluid is in contact with said plurality of rotatable elements, and where said plurality of micro-capsules are interstitially contained within a fibrous matrix;

said method comprising the steps of:

encapsulating said plurality of rotatable elements and said enabling fluid within said plurality of micro-capsules;

providing said collection of fibrous material;

performing a first manipulation of said fibrous material such that said fibrous material forms said fibrous matrix defining a plurality of preferred interstitial regions;

performing a second manipulation of said fibrous matrix and said plurality of micro-capsules such that said plurality of micro-capsules are dispersed to said preferred interstitial regions of said fibrous matrix.

27. The method of claim 26, said method further comprising:

performing a third manipulation of said rotating element sheet material wherein additional supporting material is interstitially contained within said fibrous matrix.

28. The method of claim 26, said method further comprising:

performing a third manipulation of said rotating element sheet material wherein additional supporting material is interstitially contained within said fibrous matrix;

said additional supporting material is a solid-forming material, and performing a fourth manipulation of said additional supporting material such that said additional supporting material is hardened.

29. The method of claim 26 wherein said fibrous matrix comprises a material with a low degree of birefringence.

30. The method of claim 26 wherein said fibrous matrix comprises a plurality of fibers of a material;

wherein said material is selected from one of: cellulosic fibers, cellulose acetate fibers, acrylic fibers, glass fibers, and borosilicate glass fibers.

31. A method of assembling rotating elements sheet material using a plurality of rotatable elements, using enabling fluid, and using a collection of fibrous material, where said rotating element sheet material comprises said plurality of rotatable elements and said enabling fluid interstitially contained within a fibrous matrix, and where said enabling fluid is in contact with said plurality of rotatable elements;

said method comprising the steps of:

performing a first manipulation of said plurality of rotatable elements such that said plurality of rotatable elements are in a preferred spatial configuration;

providing said collection of fibrous material;

performing a second manipulation of said fibrous material such that said fibrous material is introduced to the defined spaces in and around said plurality of rotatable elements, forming said fibrous matrix that includes said rotatable elements therein; and performing a third manipulation of said fibrous matrix and said plurality of rotatable elements wherein said enabling fluid is interstitially contained within said fibrous matrix.

32. The method of claim 31 wherein said fibrous matrix comprises a material with a low degree of birefringence.

33. The method of claim 31 wherein said fibrous matrix comprises a plurality of fibers of a material;

wherein said material is selected from one of: cellulosic fibers, cellulose acetate fibers, acrylic fibers, glass fibers, and borosilicate glass fibers.

34. A method for assembling rotating element sheet material using a plurality of rotatable elements, using enabling fluid, and using a collection of fibrous material, where said rotating element sheet material comprises said plurality of rotatable elements and said enabling fluid encapsulated within a plurality of micro-capsules, where said enabling fluid is in contact with said plurality of rotatable elements, and where said plurality of micro-capsules are interstitially contained within a fibrous matrix;

said method comprising the steps of:

encapsulating said plurality of rotatable elements and said enabling fluid within said plurality of micro-capsules;

performing a first manipulation of said plurality of micro-capsules such that said plurality of micro-capsules are in a preferred spatial configuration;

providing said collection of fibrous material;

performing a second manipulation of said fibrous material such that said fibrous material is introduced to the defined spaces in and around said plurality of micro-capsules, forming said fibrous matrix that includes said micro-capsules therein.

35. The method of claim 34, said method further comprising:

performing a third manipulation of said rotating element sheet material wherein additional supporting material is interstitially contained within said fibrous matrix.

36. The method of claim 34, said method further comprising:

performing a third manipulation of said rotating element sheet material wherein additional supporting material is interstitially contained within said fibrous matrix;

said additional supporting material is a solid-forming material, and performing a fourth manipulation of said additional supporting material such that said additional supporting material is hardened.

37. The method of claim 34 wherein said fibrous matrix comprises a material with a low degree of birefringence.

38. The method of claim 34 wherein said fibrous matrix comprises a plurality of fibers of a material;

wherein said material is selected from one of: cellulosic fibers, cellulose acetate fibers, acrylic fibers, glass fibers, and borosilicate glass fibers.

39. Rotating element sheet material produced by said method of claim 15, 16, 17, 18, 19, 20, 21, 22, 23, 24, 25, 26, 27, 28, 29, 30, 31, 32, 33, 34, 35, 36, 37, or 38.

* * * * *